US010697856B2

(12) United States Patent
Silberling et al.

(10) Patent No.: US 10,697,856 B2
(45) Date of Patent: Jun. 30, 2020

(54) TO A SOFT COLLISION PARTNER (AKA SOFT CAR) USED IN SYSTEM FOR TESTING CRASH AVOIDANCE TECHNOLOGIES

(71) Applicant: Dynamic Research, Inc., Torrance, CA (US)

(72) Inventors: Jordan Silberling, Redondo Beach, CA (US); Paul Satrom, Gardena, CA (US); Joe Kelly, Lakewood, CA (US); Brian Kebschull, San Pedro, CA (US); John Lenkeit, San Pedro, CA (US)

(73) Assignee: Dynamic Research Inc., Torrance, CA (US)

( * ) Notice: Subject to any disclaimer, the term of this patent is extended or adjusted under 35 U.S.C. 154(b) by 0 days.

(21) Appl. No.: 15/643,079

(22) Filed: Jul. 6, 2017

(65) Prior Publication Data

US 2018/0010984 A1    Jan. 11, 2018

Related U.S. Application Data

(60) Provisional application No. 62/359,929, filed on Jul. 8, 2016.

(51) Int. Cl.
*G01M 17/007* (2006.01)
*B60T 17/22* (2006.01)
(Continued)

(52) U.S. Cl.
CPC ........... *G01M 17/0078* (2013.01); *B60T 7/18* (2013.01); *B60T 7/22* (2013.01); *B60T 17/221* (2013.01);
(Continued)

(58) Field of Classification Search
CPC ........ G01M 17/0078; B60T 7/18; B60T 7/22; B60T 17/221; B60T 2201/022;
(Continued)

(56) References Cited

U.S. PATENT DOCUMENTS 5,023,451 A * 6/1991 Burley ................... G09F 13/16
250/330
5,056,817 A * 10/1991 Fuller .................... B60R 99/00
150/166
(Continued)

FOREIGN PATENT DOCUMENTS

WO        2004/062953 A2    7/2004

OTHER PUBLICATIONS

International Search Report and Written Opinion dated Sep. 13, 2017 in PCT/US2017/040965, Applicant Dynamic Research, Inc. (9 pages).

*Primary Examiner* — Nicholas Kiswanto
(74) *Attorney, Agent, or Firm* — Manuel de la Cerra

(57) ABSTRACT

A soft body system adapted to form the body and exterior surface of a Guided Soft Target for testing crash avoidance technologies in a subject vehicle is disclosed. The soft body system is adapted to be mounted atop a motorized Dynamic Motion Element (DME), and when so mounted, is adapted to collide with the subject vehicle while the DME is moving. The soft body system includes a semi-rigid form with an exterior surface. The form is sufficiently yielding so as to impart a minimal force to the subject vehicle upon impact. The form may be shaped like a vehicle or a part of a vehicle. The exterior surface includes a side skirt made of radar absorptive material (RAM), radar reflective material (RRM), or a combination of both, which is positioned adjacent to the ground and is constructed to prevent radar waves from entering into the soft body system.

17 Claims, 12 Drawing Sheets

(51) Int. Cl.

| | | |
|---|---|---|
| *G09B 19/16* | (2006.01) | |
| *B60T 7/18* | (2006.01) | |
| *B60T 7/22* | (2006.01) | |
| *G06G 7/78* | (2006.01) | |
| *G08G 1/16* | (2006.01) | |
| *G09B 19/14* | (2006.01) | |
| *G01S 13/931* | (2020.01) | |
| *G01S 7/40* | (2006.01) | |
| *G01L 5/28* | (2006.01) | |
| *H01Q 17/00* | (2006.01) | |

(52) U.S. Cl.
CPC ............ *G01M 17/007* (2013.01); *G06G 7/78* (2013.01); *G08G 1/166* (2013.01); *G09B 19/14* (2013.01); *G09B 19/16* (2013.01); *B60T 2201/022* (2013.01); *G01L 5/28* (2013.01); *G01S 13/931* (2013.01); *G01S 2007/4082* (2013.01); *H01Q 17/007* (2013.01)

(58) Field of Classification Search
CPC .......... G06G 7/78; G08G 1/166; G09B 19/14; G09B 19/16; G01L 5/28; G01S 13/931; H01Q 17/007
See application file for complete search history.

(56) References Cited

U.S. PATENT DOCUMENTS

| | | | |
|---|---|---|---|
| 5,413,027 A | 5/1995 | Mixon | |
| 5,530,588 A * | 6/1996 | Vivier | G02B 5/08 359/517 |
| 5,660,462 A | 8/1997 | Bockley et al. | |
| 6,107,952 A * | 8/2000 | Barker | H01Q 17/00 342/10 |
| 6,111,534 A | 8/2000 | Escarmant | |
| 6,377,398 B1 | 4/2002 | Pieri et al. | |
| 6,919,387 B2 | 7/2005 | Fujieda et al. | |
| 8,428,863 B2 * | 4/2013 | Kelly | B60T 7/18 52/578 |
| 8,447,509 B2 | 5/2013 | Kelly et al. | |
| 8,589,062 B2 | 11/2013 | Kelly et al. | |
| 9,182,942 B2 | 11/2015 | Kelly et al. | |
| 2004/0041428 A1 | 3/2004 | Tompson | |
| 2006/0006287 A1 * | 1/2006 | Ferguson | B64C 7/00 244/130 |
| 2008/0282876 A1 * | 11/2008 | Leivesley | B32B 27/36 89/36.02 |
| 2010/0033366 A1 * | 2/2010 | Shibata | G01S 13/345 342/70 |
| 2015/0022389 A1 * | 1/2015 | Binzer | G01S 7/02 342/1 |
| 2015/0029051 A1 | 1/2015 | Driscoll et al. | |
| 2015/0130651 A1 | 5/2015 | Mogridge et al. | |
| 2017/0315022 A1 * | 11/2017 | Simader | F21V 33/00 |

* cited by examiner

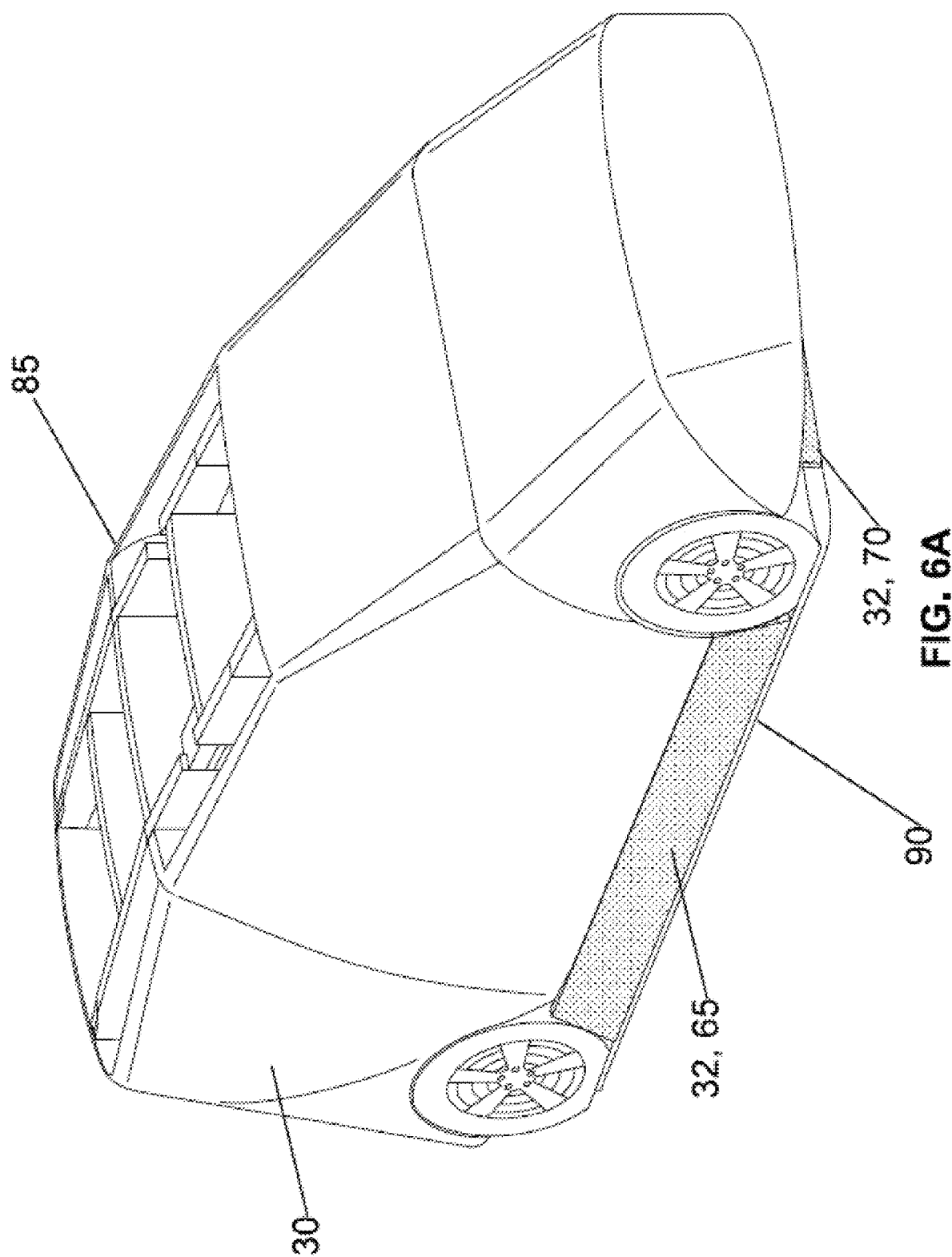

TO A SOFT COLLISION PARTNER (AKA SOFT CAR) USED IN SYSTEM FOR TESTING CRASH AVOIDANCE TECHNOLOGIES

RELATED APPLICATIONS

The present application claim priority to U.S. Provisional Patent Application No. 62/359,929 filed on Jul. 8, 2016, all of the contents of which are incorporated herein by reference including all tables, figures and claims.

The present invention is related to U.S. patent application Ser. No. 14/062,287, filed Oct. 24, 2013, which claims benefit of U.S. Provisional Application No. 61/874,274, filed Sep. 5, 2013, and claims benefit of U.S. Provisional Application No. 61/874,267, filed Sep. 5, 2013, and claims benefit of U.S. Provisional Application No. 61/874,264, filed Sep. 5, 2013, and which is a continuation-in-part application of U.S. patent application Ser. No. 13/532,417, filed Jun. 25, 2012, now U.S. Pat. No. 8,583,358, issued Nov. 12, 2013, and which is a continuation-in-part application of U.S. patent application Ser. No. 13/532,430, filed Jun. 25, 2012, now U.S. Pat. No. 8,589,062, issued Nov. 19, 2013, which claims benefit of U.S. Provisional Application No. 61/507,539, filed Jul. 13, 2011, and claims benefit of U.S. Provisional Application No. 61/578,452, filed Dec. 21, 2011, and which is a continuation-in-part application of U.S. patent application Ser. No. 13/357,526, filed Jan. 24, 2012, now U.S. Pat. No. 8,447,509, issued May 21, 2013, and which claims benefit of U.S. Provisional Application No. 61/621,597, filed Apr. 9, 2012, and which claims benefit of U.S. Provisional Application No. 61/639,745, filed Apr. 27, 2012; all of which are hereby incorporated herein by reference in their entirety including all tables, figures and claims. U.S. patent application Ser. No. 14/062,287 is also a continuation-in-part of U.S. patent application Ser. No. 14/050,039, filed Oct. 9, 2013, and is a continuation-in-part application of U.S. patent application Ser. No. 14/050,048, filed Oct. 9, 2013, all of which are hereby incorporated herein by reference in their entirety, including all tables, figures and claims.

TECHNICAL FIELD

The present invention relates to devices and systems for testing crash avoidance technologies in vehicles.

BACKGROUND

As both self-driving vehicle algorithms and Advanced Crash Avoidance Technologies (ACATs) are being developed by many manufacturers, the need to test these vehicles and technologies escalates. Full-scale test methodologies need to minimize hazards to personnel and damage to equipment. Accordingly, Guide Soft Target (hereinafter GST) systems provide a way to safely test subject vehicles in crash avoidance technologies.

GST systems act as safer surrogates for real cars and trucks during testing. In a GST system, a soft collision partner (hereinafter Soft CP) may be mounted atop a Dynamic Motion Element (hereinafter DME), which may be a Low-Profile Robotic Vehicle, or LPRV. The DME is driven, moving the Soft CP body, so that while in motion, the Soft CP may be detectable as a moving vehicle by the subject vehicle under test. ACATs on a subject test vehicle may be tested by observing how the subject vehicle responds to the GST. In thoroughly testing the crash avoidance technology, the GST system may be used in a wide variety of real-world scenarios that could result in collisions between the subject test vehicle and the GST. These tests can be used to check whether the subject test vehicle can avoid the Soft CP, and evaluate the crash avoidance technology based on measured parameters such as response time, braking distance, minimum distance between the subject vehicle and the Soft CP, etc. Compared to subject vehicle collisions with another vehicle, use of the Soft CP and DME is less hazardous for testing personnel, and minimizes the damage that the collision causes to the subject vehicle.

Prior art for Soft CPs such as a "balloon car," a rear-end target specified by the National Highway Traffic Safety Administration (NHTSA), and a cushioned crash target provided by Anthony Best Dynamics (ABD) each has its deficiencies. The balloon car is prone to damage, and is particularly prone to bursting when it is impacted at higher speeds. Aerodynamic flutter can also confuse the sensors on the subject vehicle, and becomes a problem at higher speeds. The NHTSA car-rear target can only be used for testing rear-end collisions, and is not suitable for testing any other type of collision, so it has limited applications. Finally, an ABD soft CP has a relatively large drive system that cannot be driven over or through. The ABD soft CP also cannot be tested at speeds substantially higher than 50 kilometers per hour because the momentum from a higher speed impact would cause damage, which also limits its usefulness in generating data.

U.S. Pat. No. 8,428,863 discloses a Soft CP comprised of a plurality of panels, where the novelty is that both the Soft CP body and the DME can be driven over or through. The material used for the Soft CP body would cause minimal to no damage to a subject test vehicle. When fitted with an exterior skin, the geometry of the Soft CP bodies resembles that of a full-size vehicle. Furthermore, the Soft CP body is made from modular panels that can be easily reassembled and reused after impact. Such a Soft CP is thus more practically suitable for testing ACATs across a range of conditions, including the speed, the place and the angle of the impact.

However, because GST systems depend on measurements and the reliable and accurate detection of the Soft CP body as a vehicle by crash avoidance technologies on the subject vehicle, it is desirable that the Soft CP has a radar signature close to that of real vehicles. Otherwise, the testing would not be realistic. That is, there would be many more collisions that result, because the subject vehicle would not detect the Soft CP body as a moving vehicle and might not try to avoid it.

One problem that could cause the Soft CP to reflect a radar signature substantially different from the radar signature of a real vehicle happens when radar enters the Soft CP, reflects internally, and exits the Soft CP after experiencing the many reflections inside the Soft CP. In that case, since the radar signature of the Soft CP would be different from a more typical real vehicle radar signature, the subject vehicle may fail to recognize the Soft CP as a moving object, or, even worse, mistakenly see multiple vehicles at other positions due to the radar energy reflecting inside the Soft CP before returning to the radar sensor.

Another potential problem might occur at other wavelengths, such as in the visible and infrared (VIR) spectra, where the subject vehicle may mistakenly believe there is no obstacle ahead because the reflected VIR signature may not match the signature that the subject vehicle might expect. The object of the present invention is to address such problems, reduce errors and improve accuracy and operations of the GST system by improving the radar signature and/or other signal signatures to match the signature(s) of a real vehicle.

SUMMARY

The present invention provides an elegant solution to the needs described above and offers numerous additional benefits and advantages, as will be apparent to persons of skill in the art. In one aspect, a soft body system adapted to form the body and exterior surface of a Guided Soft Target for testing crash avoidance technologies in a subject vehicle is disclosed. The soft body system is adapted to be mounted atop a motorized Dynamic Motion Element (DME) and when so mounted is adapted to collide with the subject vehicle while the DME is moving. The soft body system includes a semi-rigid form with an exterior surface. The form is sufficiently yielding so as to impart a minimal force to the subject vehicle upon impact. The form may be shaped like a vehicle or a part of a vehicle. The exterior surface is substantially covered in material that is opaque to radar (i.e., either radar reflective material (RRM) or radar absorptive material (RAM)) in order to prevent radar waves from entering the interior of the Soft CP. The exterior surface may include a side skirt made of RAM, RAM or a combination of both which is positioned adjacent to the ground and has an edge that runs substantially parallel to the ground.

The exterior surface may further include a front and rear skirts made of RAM, RRM or both, and is positioned adjacent to the ground. The side skirt, front skirt and rear skirt may circumscribe an area, and the DME may be disposed of in the area. The exterior surface may also include front and rear overhang structures made of RRM, RAM or both, the overhang structures extending away from the DME and running substantially parallel to the ground. The exterior surface may also include one or more wheel pieces that contain RRM or RAM. The exterior surface can also include visual and infrared (VIR) reflective material to provide at least one VIR reflection signature of the subject vehicle. The VIR reflective material may be located on areas of the exterior surface corresponding to positions of at least one of the following in a vehicle: license plate(s), rear brake lights, headlights, corner reflectors, and turn signal indicators. Side reflectors including VIR reflective material may be used to mimic the reflectivity of a side mirror. The exterior surface may be a flexible covering.

The semi-rigid form may be constructed from a plurality of pieces, including interconnecting longitudinal and vertical bulkheads. The plurality of pieces may include RRM or RAM.

The soft body system may include a roof, a roofline, and second surface extending substantially vertically from the roofline. The second surface may be substantially covered in RRM or RAM. The roof may be made of material that is substantially permeable to electromagnetic energy such that GPS signals and other communication signals may reach the DME without substantial attenuations from the semi-rigid form.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 6A is an isometric top view of an embodiment utilizing the RRM and RAM.

DETAILED DESCRIPTION

Figure 1:
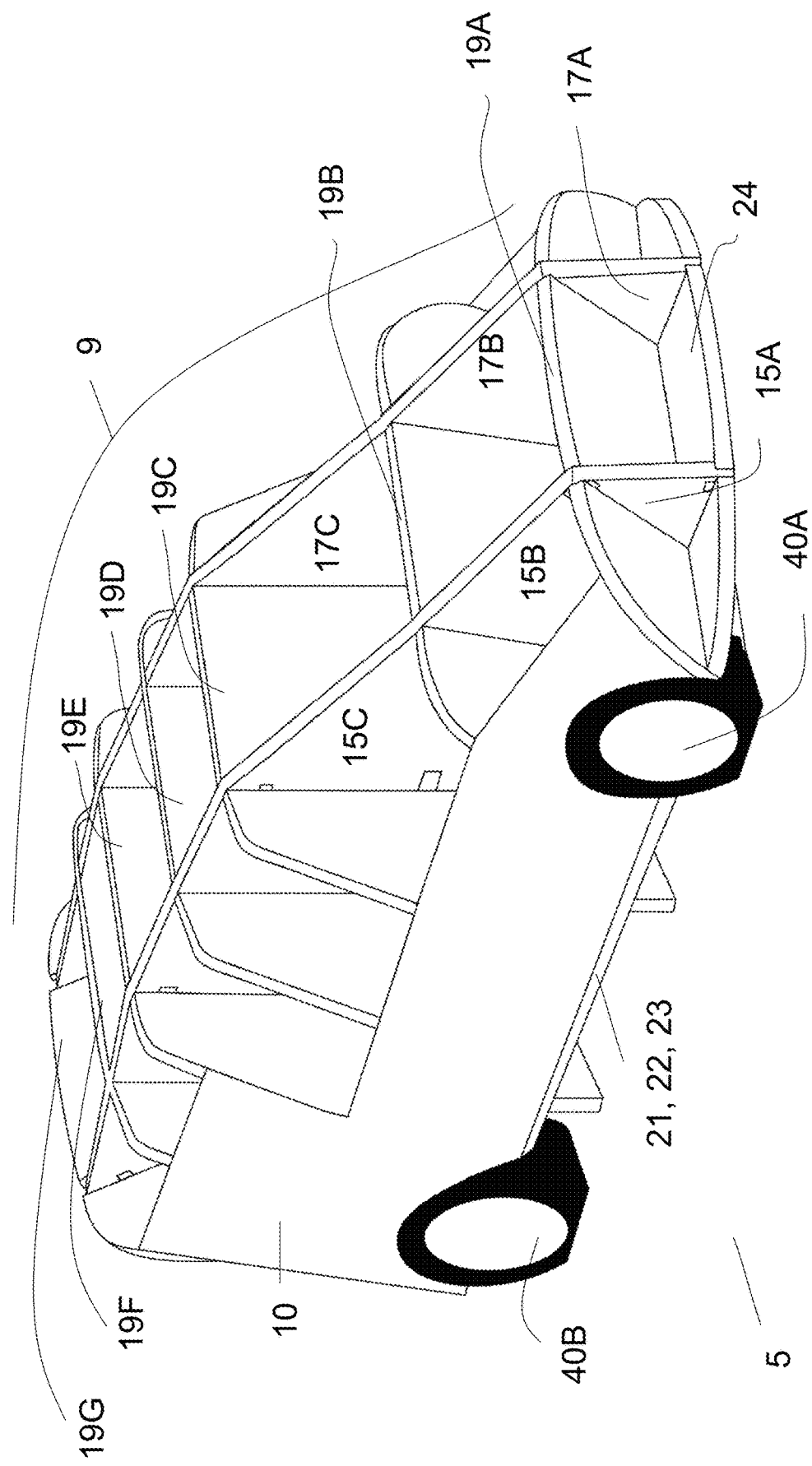
FIG. 1 is a cutaway perspective view of a Soft CP with foam panels forming the interior framework and an exterior skin covering.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with FIGS. 1-11 and is provided for ease of reference, where like reference numerals designate corresponding features throughout the specification and figures:

Soft CP 5
Interior Framework for the Soft CP 9
Exterior Surface Covering 10
Vertical Bulkheads 15, 17
Vertical Bulkhead Sections 15A, 15B, 15C, 17A, 17B, 17C
Longitudinal Bulkheads 19, 19A, 19B, 19C, 19D, 19E, 19F, 19G
Horizontal Bulkhead Sections 21, 22
Front horizontal overhang 24
Rear horizontal overhang 25
Radar Reflective Material (RRM) 30
Radar Absorptive Material (RAM) 32
Additional Radar Reflective Material (RRM) 35A, 35B, 35C
Optional Front Reflective Spoiler 37
Optional Rear Reflective Spoiler 38
Wheel Pieces 40A, 40B, 40C, 40D
Left Headlight 41
Right Headlight 42
Left Headlight VIR Reflective Piece 43
Right Headlight VIR Reflective Piece 44
Front License Plate 45
Back License Plate 46
Left Tail Light 47
Right Tail Light 48
High Center Tail Light 49
Left Rear Corner Reflector 51
Right Rear Corner Reflector 52
Left Rear Corner Reflector VIR Reflective Piece 53
Right Rear Corner Reflector VIR Reflective Piece 54
Left Tail Light VIR Reflective Piece 57
Right Tail Light VIR Reflective Piece 58
High Center Tail Light VIR Reflective Piece 59
Side Marker Reflector 60
Side Marker Reflector Support Structure 61
Side Skirt 65
Front Skirt 70
Rear Skirt 75
Location of DME 80
Open Roof 85
DME 90

Referring now to FIG. 1, an example embodiment of a Soft CP 5 is shown. The Soft CP 5 is considered to be the vehicle or part of a vehicle and is so shaped. It is intended to represent a vehicle in the GST system and intended to be detected by the subject test vehicle as a vehicle with which the subject test vehicle may potentially collide. The Soft CP is made of a semi-rigid form with an exterior surface, the form is sufficiently yielding so as to impart a minimal force to the subject test vehicle upon impact. The force causing minimal to no damage to the subject test vehicle. The exterior surface may be a flexible covering that can cover the semi-rigid form.

It must be noted that the semi-rigid form may be made of a single piece, such as a car-shaped block of foam, or a car-shaped balloon. Also, the form need not be an entire car, but may be a portion of a car. For example, the testing for front end collisions may only require that the Soft CP represent only the front end of a car.

FIG. 1 illustrates such a semi-rigid form comprised of a plurality of pieces, in this case interlocking bulkheads. The term "bulkhead" shall be used throughout the detailed description, and is used in the context of the Oxford Dictionary's definition of the term, as "a dividing wall or barrier between separate compartments inside a ship, aircraft, or other vehicle." The bulkheads in the Soft CP 5 can be considered to be the entire walls or barriers formed by one or more foam panels, which divide the interior of the Soft CP 5 into various compartments and surfaces, rather than each individual compartmentalized surface. However, "bulkhead sections" shall refer to individual compartmentalized surfaces.

The Soft CP 5 has an interior framework 9 composed of foam panels, formed in such a way that when the subject test vehicle collides with the Soft CP 5, the Soft CP 5 may come apart and be driven over or through. In this example embodiment, there are two main vertical bulkheads 15, 17 running from the front of the Soft CP 5 body to the rear of the Soft CP 5 body. The vertical bulkheads 15, 17 intersect with the longitudinal bulkheads 19A-19G that run from the left side of the Soft 5 CP body to the right side of the Soft 5 CP body, forming the vertical bulkhead sections 15A, 15B, and 15C as vertical surfaces, and the vertical bulkhead sections 17A, 17B, and 17C as vertical surfaces. There are more vertical surfaces created by the intersection of the vertical bulkheads 15, 17 with the longitudinal bulkheads 19A-19G, but they are not labeled to avoid unnecessarily obfuscating the invention. There is at least one lower horizontal bulkhead, which, because of the intersections it has with the vertical bulkheads 15, 17 and the longitudinal bulkheads 19A-19G, is divided into multiple horizontal surfaces (21, 22, 23, etc.). The bulkheads may be covered with a flexible exterior surface covering 10 that may be comprised of fabric, as a non-limiting example. The Soft CP 5 also features a front horizontal overhang 24 and a rear horizontal overhang 25, which is not visible in FIG. 1. The soft CP 5 body also includes the wheel pieces 40A-40D, of which only 40A and 40B can be viewed from the perspective view in FIG. 1. All bulkheads and interior surfaces may be considered to be parts of the interior framework 9, which is then covered over by the exterior surface covering 10. Note that the exterior surface covering 10 is assumed throughout the subsequent description to be substantially or partially covered by, enveloped in, bonded to, or made from RRM 30, which is why it is sometimes labeled as both. In subsequent FIGS. 2-11, the longitudinal bulkheads 19A-19G will not be labeled, to avoid obfuscating the invention.

Figure 2:
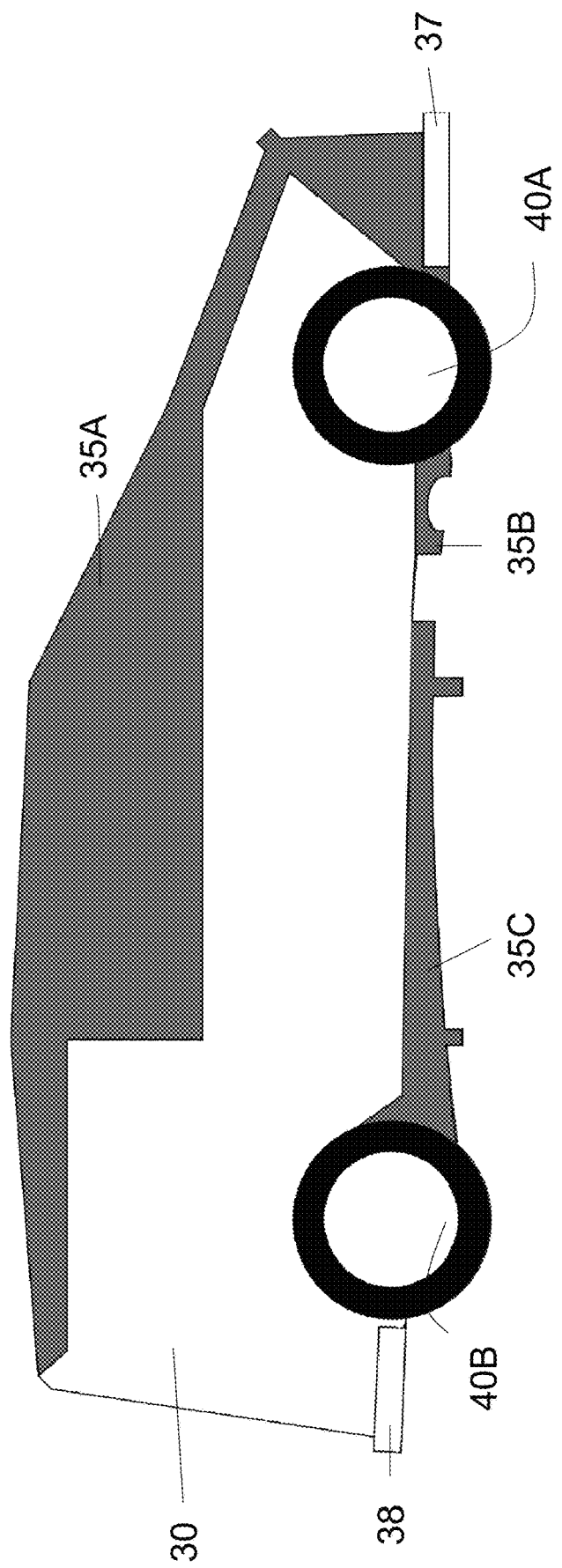
FIG. 2 shows areas where additional RRM may be used in the Soft CP body.

FIG. 2 shows a side view, and in particular illustrates the extent to which RRM may cover the vehicle. In FIG. 2 and all subsequent drawing sheets, the element 30 refers to RRM over a surface. The RRM may be coated or bonded to a surface, or otherwise attached to the surface through some other means, as would be apparent to those skilled in the art. Generally, RRM 30 should coat the part of the Soft CP 5 over locations that correspond to the chassis of a similar vehicle, and may or may not cover the windows. Areas 35A, 35B, 35C, 37, and 38 are shown as areas where additional RRM may be used, so that the radar signature of the Soft CP 5 can more accurately match the radar signature of a similar real vehicle. A better radar signature match facilitates better detection of the Soft CP 5 by the subject vehicle, and results in fewer "false positive" collisions between the subject vehicle and the Soft CP 5, which may occur not because the ACAT under test is not robust, but simply because the Soft CP 5 is not recognized as a vehicle. Therefore, a more accurate radar signature enables more detections or recognitions, to allow more accurate testing of the ACAT.

The area 35A represents RRM coverage up to the roofline, and may involve using RRM on the front surfaces and/or the front bulkhead, as well as using RRM on the vertical surfaces and/or bulkheads within the interior framework 9 of the Soft CP 5. In particular, using the RRM higher on the sides, as 35A suggests, assists the blind spot sensors on the subject vehicle detect the Soft CP 5 when measuring from a close range. Areas 35B and 35C indicate that parts of the lower horizontal bulkhead may be covered or coated with RRM, as well as surfaces of the longitudinal bulkheads that may extend at or below the lower horizontal bulkhead. Elements 37 and 38 represent optional reflective spoilers that could extend a certain distance below the lower portion of the Soft CP 5, which can help provide a better estimate of the object length and depth of the Soft CP 5 for radar systems, as opposed to just the nearest distance or position. The optional front reflective spoiler 37 and the optional rear reflective spoiler 38 can also help to hide the DME (that is, reduce its radar signature, which is beneficial because typical real vehicles generally do not provide strong radar reflections from near the ground) on which the Soft CP 5 is mounted, from the front and from the rear.

The wheel pieces, such as 40A and 40B, may be of a diameter that matches that of a real wheel, and have a radar cross section (RCS) that resembles that of real wheels. However, it is recognized that larger diameter wheels may have more potential to damage the subject test vehicle in the event of a collision, in addition to having the drawback of potentially necessitating design changes in the interior framework 9 and the exterior surface covering 10 of the Soft CP 5. Ideally, all wheel pieces should have discrete radar reflections such that they can be detected by a radar sensor as distinct objects relative to the rest of the Soft CP 5. Moreover, to make the radar signatures of the wheels 40A-40D even more realistic, wheel wells may be simulated with material that is not reflective to radar on the exterior surface covering 10 of the Soft CP 5 to emulate what happens in the wheel wells of a real vehicle.

Although FIG. 2 indicates that while RRM 30 may be used all the way up to the roofline of the Soft CP 5, it would be desirable to not completely envelope the Soft CP 5, so as to enable proper GPS signal transmission and reception (as well as proper signal transmission and reception of other wireless communication systems that may be used by the DME). The DME moving the Soft CP 5 may require GPS signals for proper operation and dynamic control, for instance. Completely enveloping the Soft CP 5 in RRM 30 would require the GPS antenna to be mounted at the top of the Soft CP 5, meaning that it would also require the use of a breakaway antenna cable, which would be prone to damage during a collision, and which also typically exhibits undesirable levels of signal attenuation, degrading GPS signal performance by the GPS receiver. The use of a combined GPS/IMU (Inertial Measurement Unit) system may also be undesirable, because it requires that the GPS antenna be mounted rigidly relative to the Inertial Measurement Unit, in order to maximize the accuracy of the reported position of the Soft CP 5. Since the Soft CP 5 is not a rigid body, but a collapsible and reusable system comprising foam panels that may be driven through or over, the position of the GPS antenna could change dynamically relative to the position of the Inertial Measurement Unit, which would decrease the accuracy of the reported position. Mounting the GPS antenna on the surface of the DME in such a way that it is not damaged when there is a collision, and the subject vehicle drives over the DME, may be more desirable. Accordingly, FIG. 2 shows a gap on the underside of the Soft CP 5 (between 35B and 35C), which might correspond to the location of the GPS antenna on the DME relative to the Soft CP 5.

A better approach to ensure proper and unimpeded GPS operation and dynamic control would be to leave the top/ roof, or at least some portion of the top/roof, of the Soft CP 5 not covered by RRM 30; rather, the roof may be covered by a material that is permeable to electromagnetic energy that might be emitted or received from the GPS antenna or other wireless communication systems of the DME. This is shown in greater detail in FIG. 6A. Since ACAT radar sensors are typically directed relatively low, closer to the road surface, and not to the top of vehicles, the radar energy that enters the top of the Soft CP 5 may be considered to be negligible. GPS signals, however, are transmitted from above, so as long as the GPS antenna is not blocked from above, it can send and receive signals without obstruction. Similarly, if the Soft CP 5 or DME features wireless LAN radios, those can also transmit and receive signals without obstruction, as long as they are not covered by RRM 30 from above. It further may be desirable to raise the location of the GPS antenna, which in conjunction with the permeable material along the roof, provides for a more robust reception of GPS signals, which in turn, produces more accurate and controlled collision testing.

Figure 3:
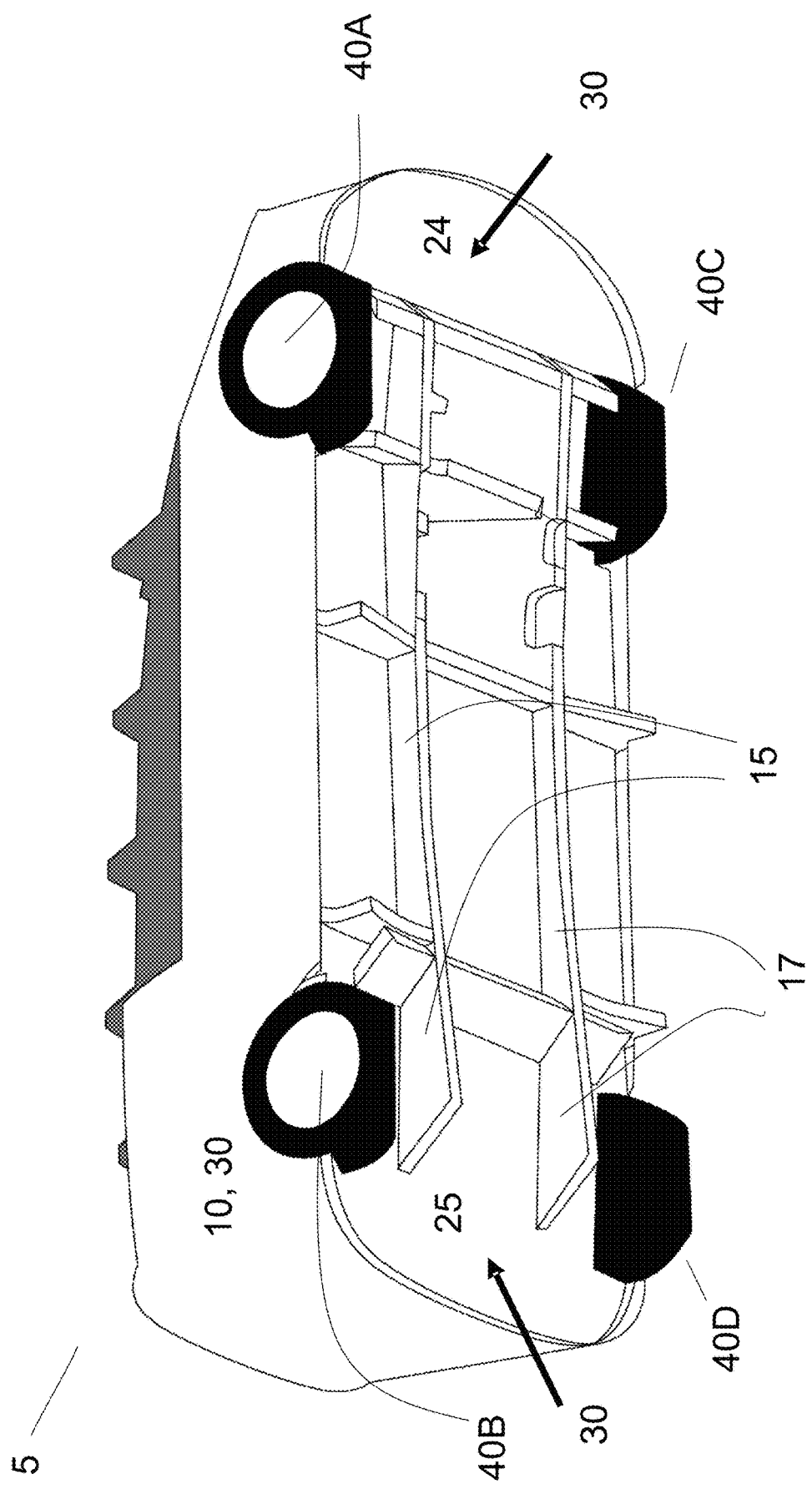
FIG. 3 is a bottom perspective view of the front and rear bulkheads of the soft CP interior frame where RRM may be added to the Soft CP.
Figure 4:
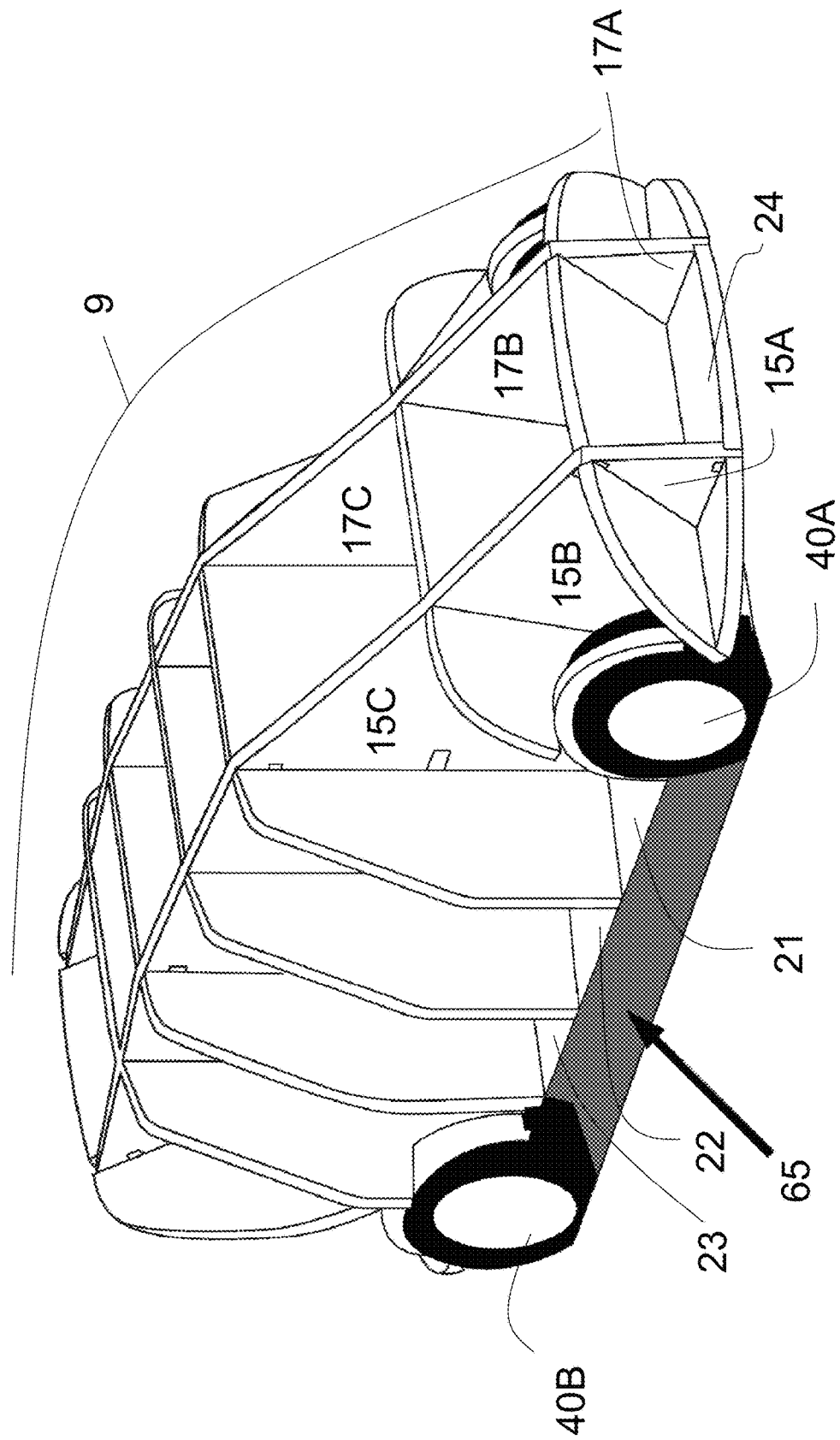
FIG. 4 shows a radar-absorptive side skirt on the Soft CP.
Figure 5:
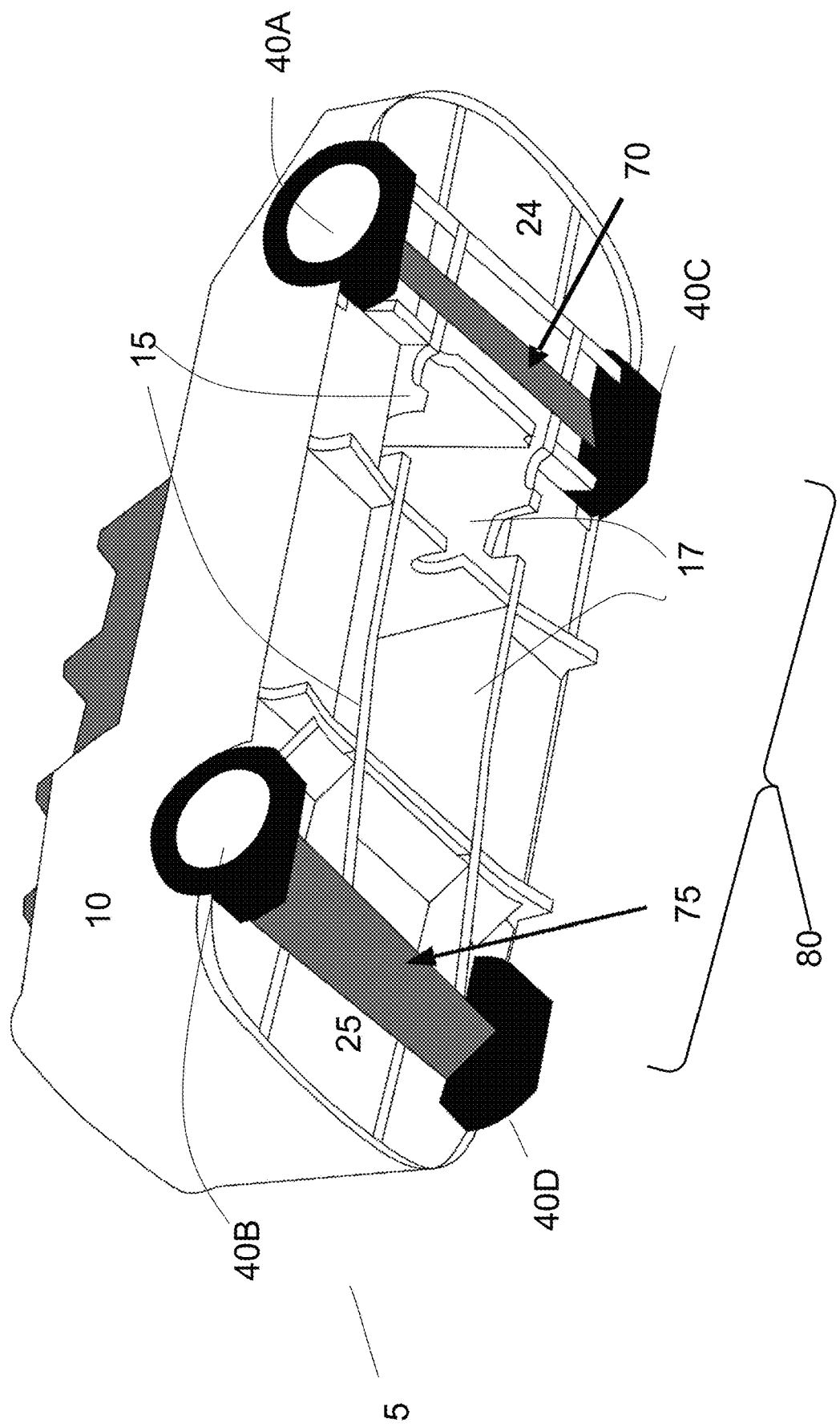
FIG. 5 shows both a radar-absorptive front skirt and a radar-absorptive rear skirt on the Soft CP.

FIGS. 3-5 are perspective views that show where RRM 30 may be applied to the components of the interior framework 9, so as to prevent radar energy from entering inside the Soft CP 5, where it might reflect around and return an incorrect radar signal to a sensor trying to detect the Soft CP 5 or measure parameters such as the speed of the Soft CP 5.

In FIG. 3, which shows the underside of the Soft CP 5, the dark arrows indicate that the RRM 30 is applied to the underside of the front horizontal overhang 24 and the rear horizontal overhang 25, which may attach to or interlock with the vertical bulkheads 15, 17. Applying RRM 30 to the underside of these horizontal overhangs 24, 25 helps prevent radar from entering the interior of the Soft CP 5 from under the exterior surface covering 10 from the front and rear of the Soft CP 5. The front and rear horizontal overhangs (24, 25) extend away from the DME and run substantially parallel to the ground. These overhangs may also include RAM to better represent an accurate radar signature to the test vehicle.

The effect of the DME underneath the Soft CP 5 to camera sensors should be considered. The DME is generally a low-profile platform, but camera sensors may see the DME underneath the Soft CP 5 instead of a gap with the ground, which is the case with a real vehicle, so the camera systems may not identify the Soft CP 5 as a vehicle if the DME is visible. Therefore, to make it easier for camera systems to recognize the Soft CP 5 as a vehicle, skirts made of RAM (which could be fabric, as a non-limiting example) that may block out light, which may be attached to the horizontal bulkhead surfaces 21, 22, and 23, as drawn in FIG. 9, or the to the exterior surface covering 10. These skirts absorb radar not only shield the DME from the incoming radar (and subsequent deleterious internal reflections), but also appear to the radar detectors of the subject vehicle as a gap as in a real car. The radar detection system would conclude that the radar signals travel completely underneath the Soft CP and did not reflect back, hence emulating the gap. These skirts are positioned adjacent to the ground and contain an edge that runs substantially parallel to the ground, and are constructed to prevent radar waves from entering the Soft CP. The skirts may be detachable from the Soft CP or may be integrally formed therein.

FIG. 4 shows a non-reflective (to light and radar) side skirt 65, which may be attached to both sides of the vehicle, if so desired. FIG. 5 is a bottom perspective view of the Soft CP 5 and illustrates examples of locations where a front skirt 70 and/or a rear skirt 75 may be attached. The front skirt 70 and rear skirt 75 may be placed at other locations, such as hanging off the front and rear horizontal overhangs 24 and 25, without departing from the spirit and scope of the present invention. There may be many other suitable locations for the placement of the front skirt 70, rear skirt 75, and/or the side skirt(s) 65. For particular test crash scenarios and faster setup/assembly of the Soft CP 5, some skirts may be omitted. Again, the front and rear skirt both shield the DME from radar and emulate the gap underneath the car. Like the side skirts 65, the front and rear skirts (70, 75) are positioned adjacent to the ground and have an edge that runs substantially parallel to the ground.

It is within the boundaries of the side skirts 65, the front skirt 70 and rear skirt 75, shown longitudinally by bracket 80 in FIG. 5, that the DME may reside, and the Soft CP may overhang the DME as shown in horizontal overhangs 24 and 25. As discussed above with reference to FIG. 3, having RRM on these overhangs prevents the radar signals from entering the inside of the Soft CP. The skirts (65, 70, 75) further prevent the radar signals from entering the Soft CP. In some embodiments, these skirts may contain RRM to better represent an accurate radar signature to the test vehicle. These structures together form a bowl that keeps radar signals from entering the interior, and therefore prevent reflective radar signatures that have internal reflections that are not emulative of a real car.

In a smaller Soft CP, where the DME footprint is substantially the same as that of the Soft CP or where the front of the Soft CP is mounted directly over the DME (i.e., there is no front and/or rear horizontal overhang 24, 25), and the front and rear radar absorbing skirts may be used to shield the DME from radar and emulate the gap underneath the car.

Figure 6B:
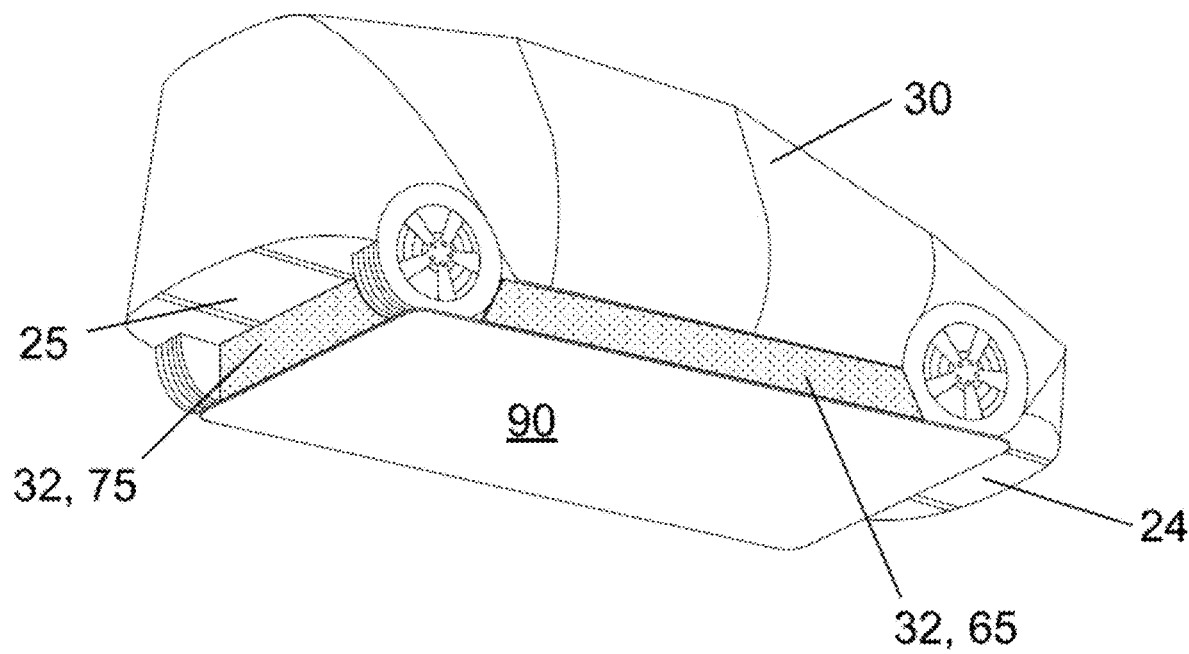
FIG. 6B is a rear isometric bottom view of an embodiment utilizing the RRM and RAM.
Figure 6C:
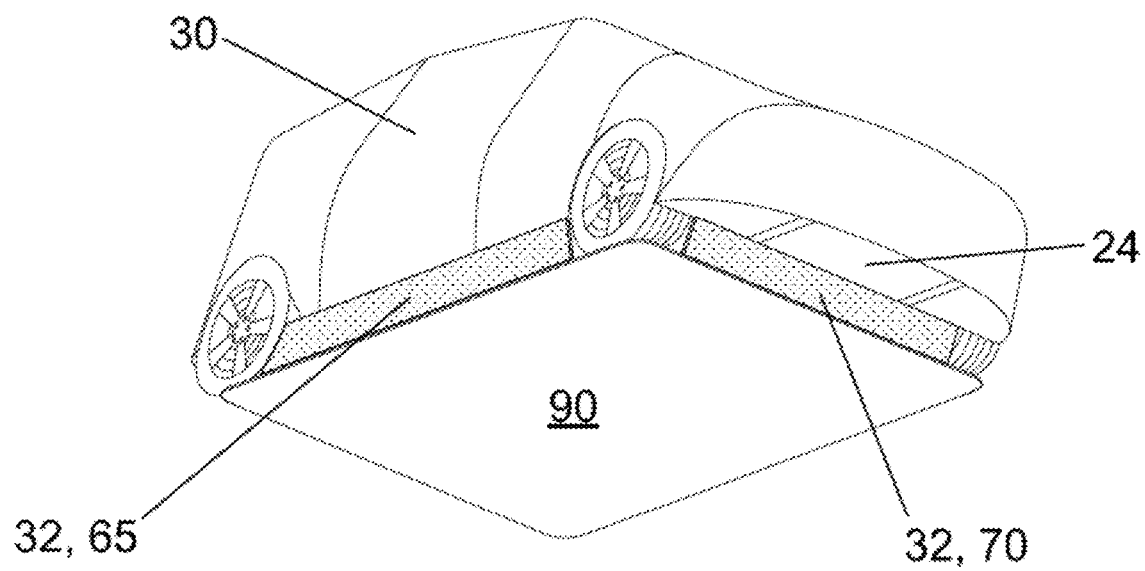
FIG. 6C is a front isometric bottom view of an embodiment utilizing the RRM and RAM.

FIGS. 6A-6C illustrate a Hatchback Soft CP made according to the disclosure herein mounted to a DME 90. The exterior surface of the Soft CP is made of RRM 30, and the side, front and rear skirts (65, 70, 75) are made of RAM 32. The front and read horizontal overhangs 24, 25 are made of RRM, such that radar signals cannot enter the interior of the Soft CP. The front and rear horizontal overhangs (24, 25) extend away from the DME 90 and run substantially parallel to the ground. To assist with GPS and on-board communications, the Soft CP may have an open roof line 85. It is shown as completely open, but in practice it would be preferable to have a fabric-like covering of the roof line (such a covering that is permeable to electromagnetic energy) to prevent wind from entering the Soft CP and blowing it off the DME.

Figure 7:
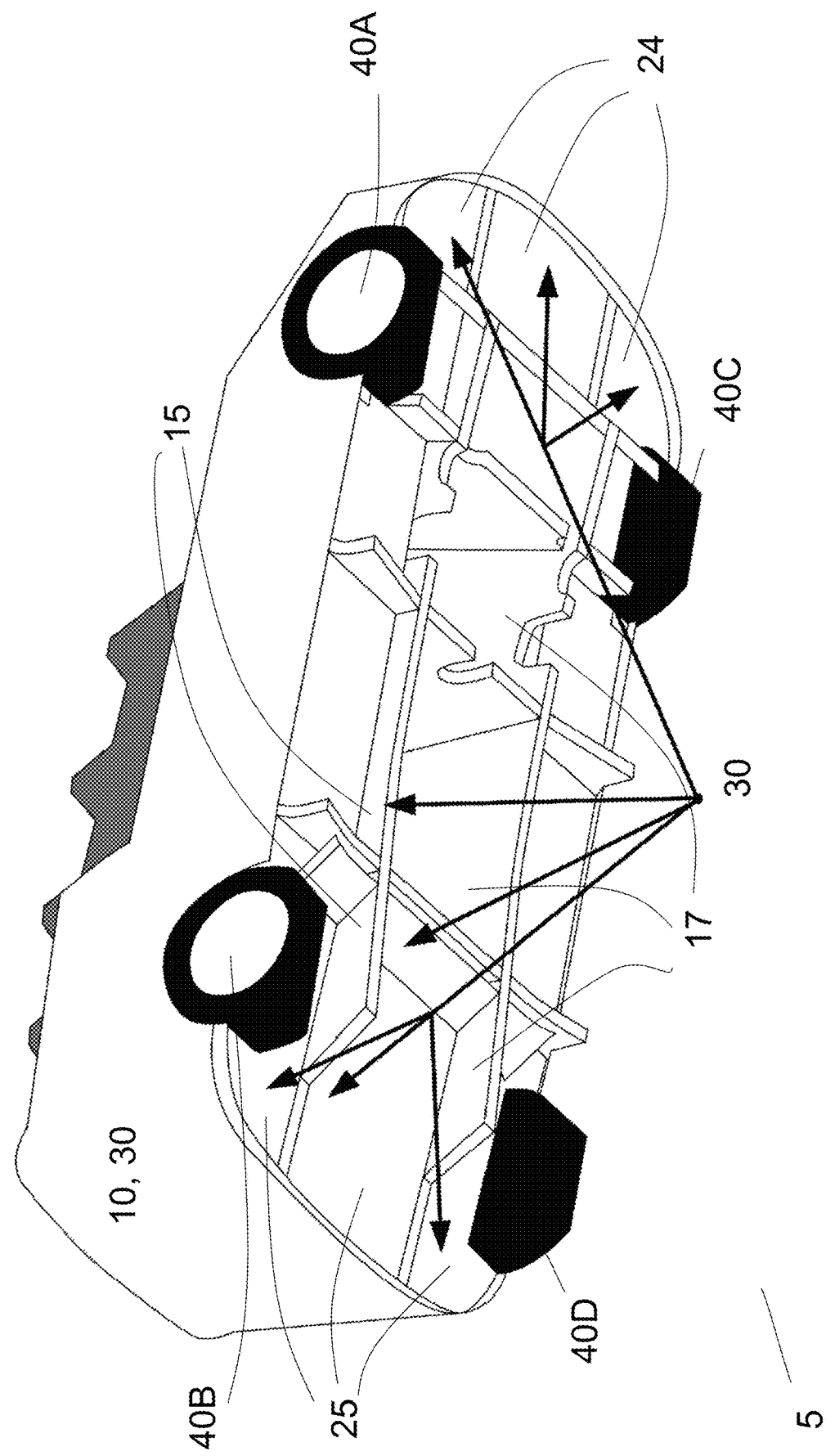
FIG. 7 illustrates the vertical and horizontal panels or bulkheads where RRM may be used to prevent radar signals from entering the inside of the Soft CP.

FIG. 7 shows an embodiment of the underside of an example Soft CP 5, and illustrates that in addition to the front and rear horizontal overhangs 24, 25, RRM 30 may be placed on the edges and/or surfaces of the vertical bulkheads 15, 17 as well as on some of the longitudinal bulkheads 19. This can further reduce the radar energy that may enter the Soft CP 5 body from the sides of the Soft CP 5. The RRM 30 on these surfaces of the vertical and longitudinal bulkheads may extend all the way to the roof of the Soft CP 5 (FIG. 2). However, only the outer bulkhead walls and surfaces need be covered by RRM 30, because the GPS antenna may be located underneath an inner compartment of the interior framework 9, and the GPS antenna should not be too closely surrounded by RRM 30.

Figure 8:
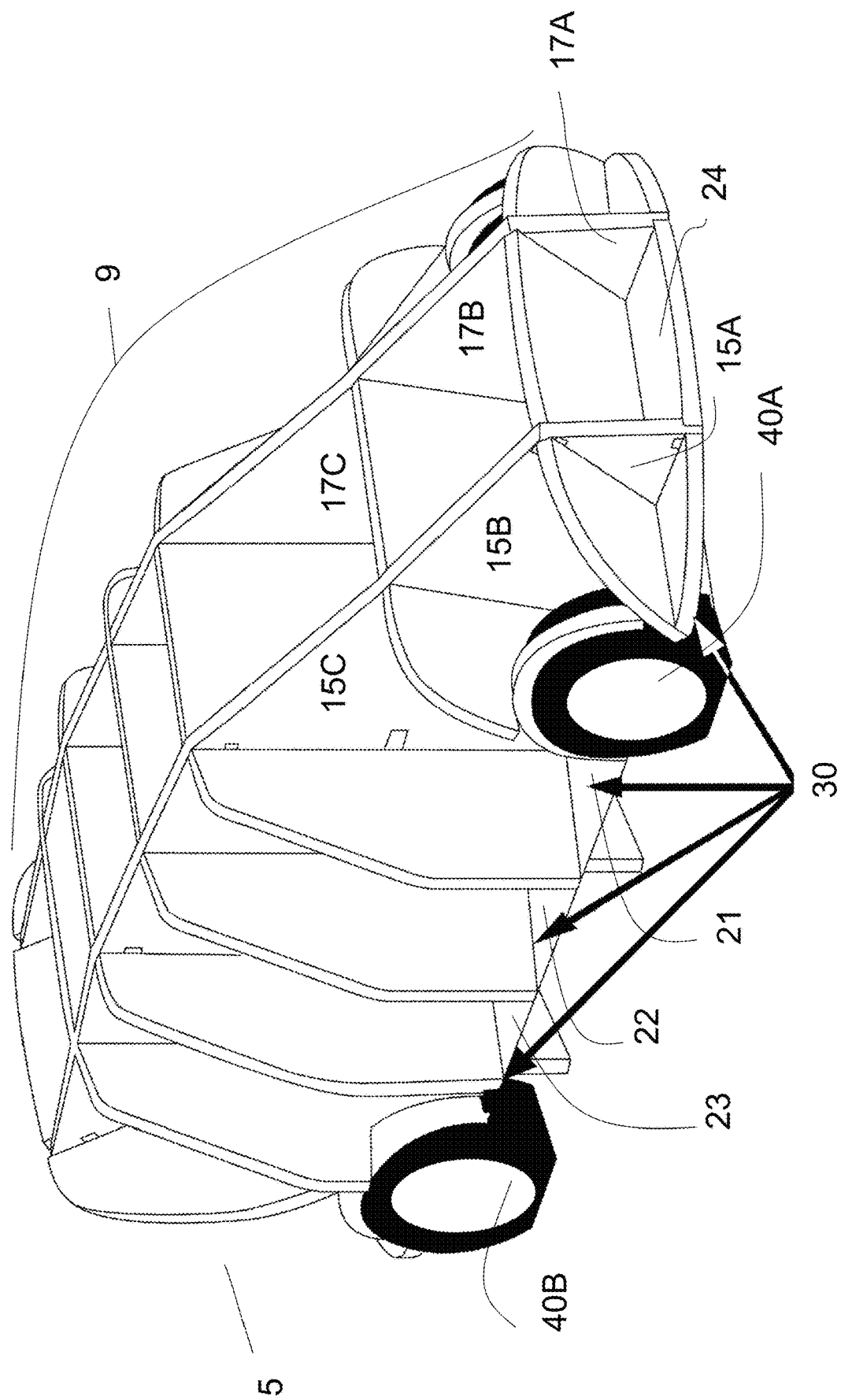
FIG. 8 illustrates the lower horizontal panels or bulkheads where RRM may be used to prevent radar signals from entering the side of the Soft CP.

FIG. 8 is a top perspective view of an embodiment that further shows that the outer top surfaces 21, 22, and 23 of the horizontal bulkheads, as well as the horizontal bulkhead edges, could be coated or covered in RRM 30. Alternatively, the corresponding underside of surfaces 21, 22, and 23 and/or edges could be coated or covered instead. Both options may be considered functionally equivalent. Covering or coating only outer surfaces of the horizontal bulkhead, in addition to covering or coating the outer vertical and longitudinal bulkheads, should be sufficient to prevent radar energy from entering into the Soft CP 5 body from underneath the exterior surface covering 10. If the radar does not enter the body, it cannot internally reflect inside of the Soft CP 5 and compromise the radar signature of the Soft CP 5. Note that while covering or coating the entire lower horizontal bulkhead (all lower horizontal surfaces) would not depart from the spirit or scope of this invention, it may not be optimal, since doing so may block a GPS antenna on a DME underneath the Soft CP 5 from above and adversely affect the operability of the GST system.

In addition to considering the radar signature the Soft CP 5 reflects back, other reflective signatures could be considered, such as the reflection of VIR light, which may be used in ACATs and self-driving vehicles to detect the presence of objects or targets. Accordingly, material reflective to light should be used at locations on the Soft CP 5 to match the reflectivity of a real vehicle, especially in locations where there are lights or other reflective surfaces on a real vehicle. FIGS. 9A-11 illustrate improvements or additions that could be made to the Soft CP 5 system so that it can better match the VIR reflectivity of real vehicles.

Figure 9B:
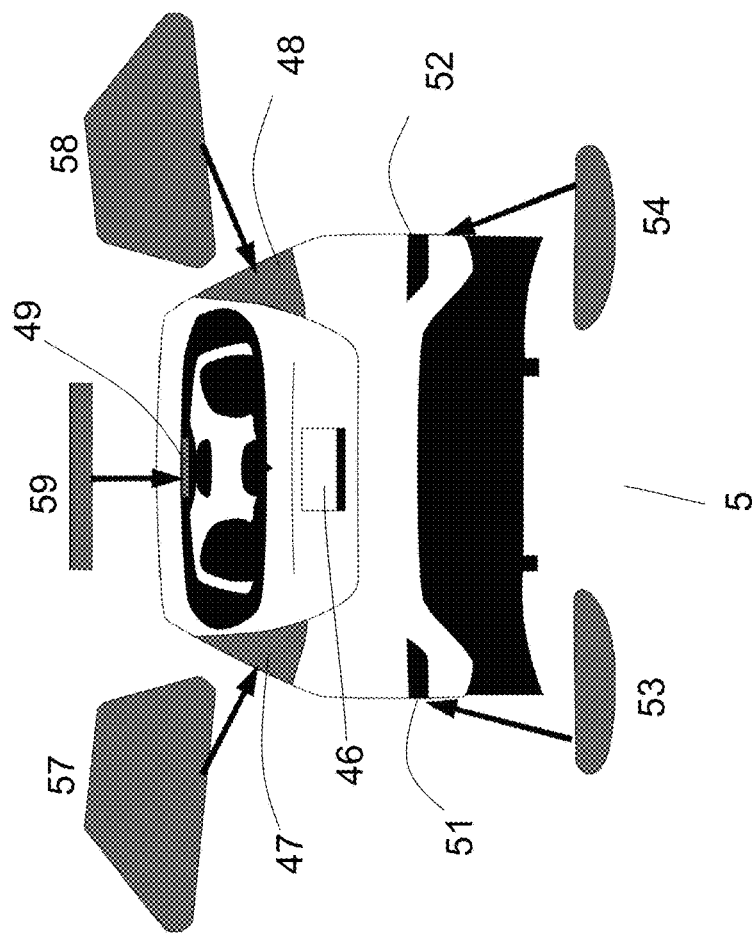
FIG. 9B shows the areas where VIR reflective material may be placed on the exterior surface of the Soft CP in the back of the Soft CP
Figure 9A:
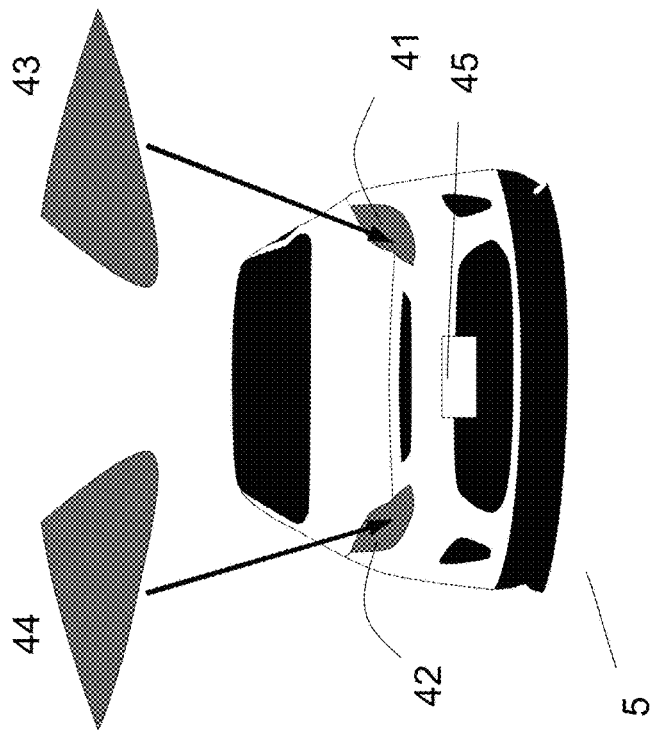
FIG. 9A shows the areas where VIR reflective material may be placed on the exterior surface of the Soft CP in the front of the Soft CP.
Figure 10:
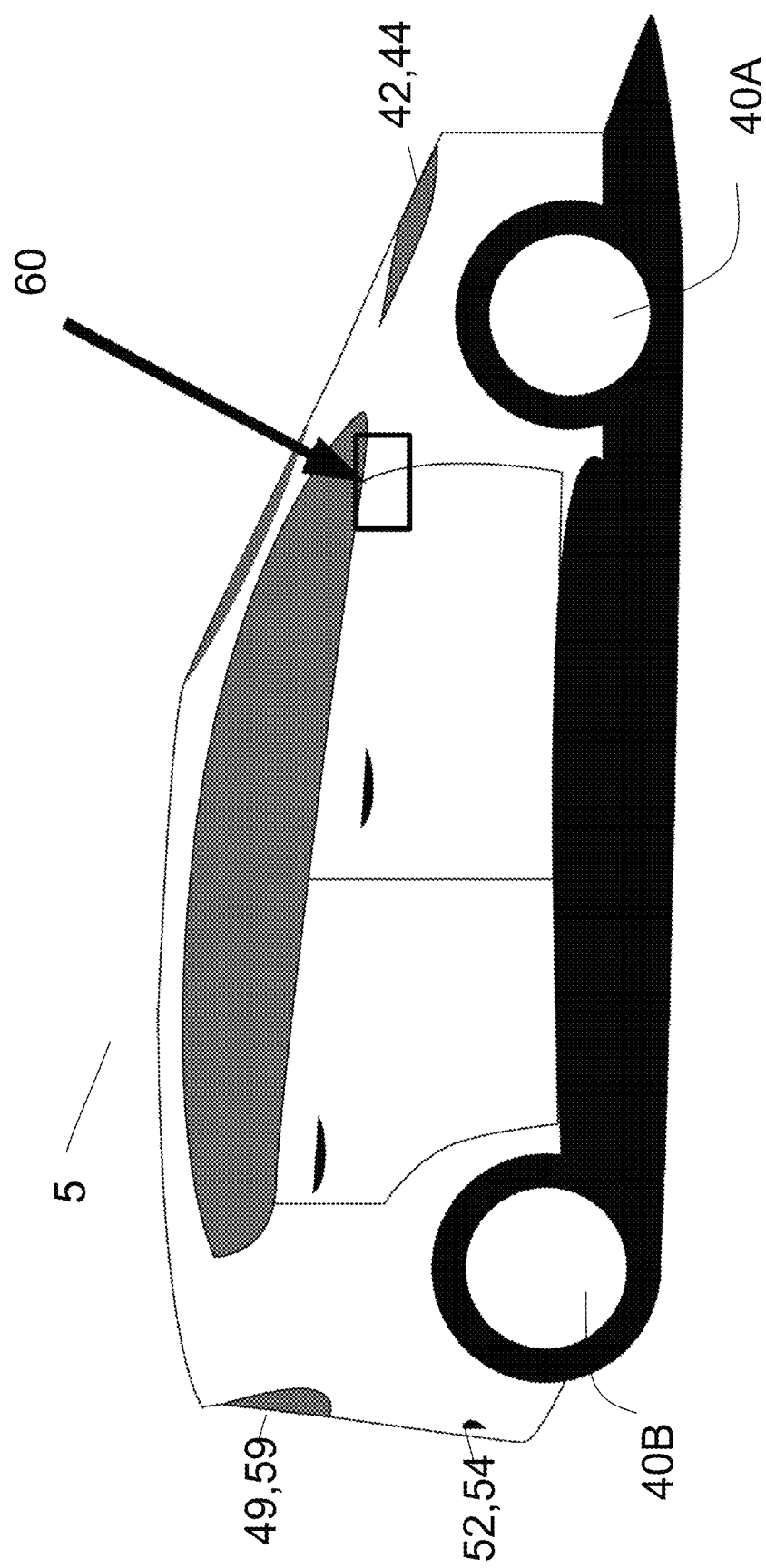
FIG. 10 illustrates the position on the exterior of the Soft CP where a "side mirror" structure wrapped in VIR reflective material may be placed to match the reflectivity of a real vehicle.

In FIG. 9A, which shows the front of the Soft CP 5, the left headlight VIR reflective piece 43 and the right headlight VIR reflective piece 44 may cover or be attached to an area on the exterior surface covering 10 that correspond to the left headlight 41, and to the right headlight 42. Furthermore, a rectangular piece of VIR reflective material, of the same reflectivity properties or different reflectivity properties as the headlight reflective pieces, may be used on the exterior surface covering 10 of the Soft CP 5 at the location of the front license plate 45 to account for and match the reflectivity of a front license plate 45 on a real vehicle.

In FIG. 9B, which shows the rear of the Soft CP 5, a rectangular piece of VIR reflective material may cover or be attached to the exterior surface covering 10 at the location of the rear license plate 46. There may be more lights at the back of the Soft CP 5. On a real vehicle, there may be corner reflectors 51, 52 in addition to a left tail light 47, a right tail light 48, and a high center tail light 49. Accordingly, on the Soft CP 5 the left rear corner reflector VIR reflective piece 53, the right rear corner reflector VIR reflective piece 54, the left tail light VIR reflective piece 57, the right tail light VIR reflective piece 58, and the high center tail light VIR reflective piece 59 could be placed at the respective corresponding positions on the exterior surface covering 10 of the Soft CP 5. Although not pictured in FIG. 9A, there might conceivably be front corner reflectors, which might be modeled with front corner reflector VIR reflective pieces similarly shaped to 53 and 54.

In addition to the above-mentioned reflective surfaces, the side mirrors of a real vehicle are generally reflective to light and infrared. In order to account for this, the Soft CP 5 could additionally feature a side marker reflector 60 at the location pointed to by the dark arrow in FIG. 10, on either/both side(s) of the Soft CP 5. This side marker reflector may be of any two-dimensional shape, or have a three-dimensional geometry supported from within the interior framework 9 and attached to the exterior surface covering 10 of the Soft CP 5.

Figure 11:
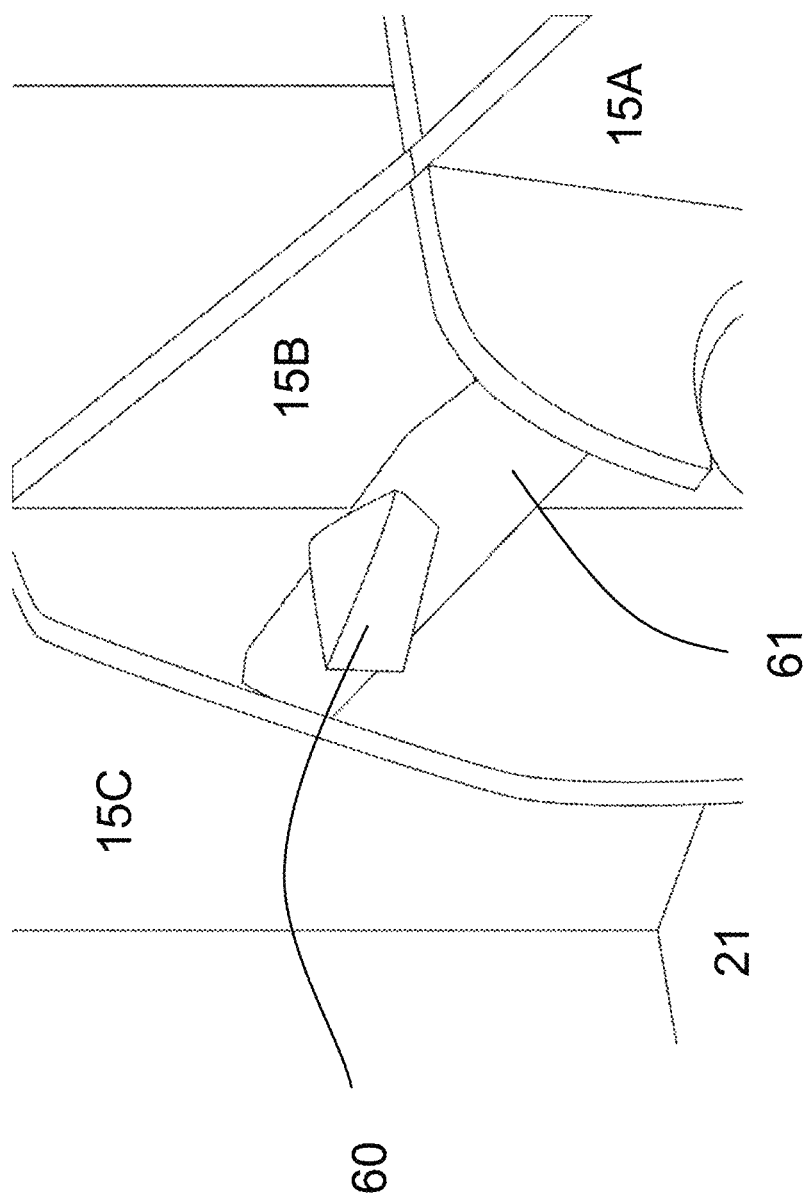
FIG. 11 shows an example embodiment of a support structure for a side mirror, in a cutaway perspective view.

In FIG. 11, which shows a three-dimensional embodiment of the side marker reflector 60, as well as an underlying side marker reflector support structure 61, the exterior surface covering 10 is not shown, in order to illustrate this aspect more clearly. The side marker reflector support structure 61 supports the side marker reflector 60 from underneath, but may itself be attached to and/or supported by longitudinal bulkhead walls and/or a vertical bulkhead surface, such as 15B, shown in FIG. 11. The exterior surface covering 10 may cover over the support structure 61, and the side marker reflector 60 may then be wrapped in RRM 30 and attached (with Velcro, for instance) to the exterior surface covering 10, supported by the support structure 61, which could be located beneath the side marker reflector 60 underneath the exterior surface covering 10.

Not only would the light reflective pieces shown in FIGS. 9A-11 help with improving the VIR signature of the Soft CP 5, but they can also help the camera sensors (onboard, for example, a subject test vehicle) classify the Soft CP 5 as a vehicle. Maintaining the correct shape and the correct graphics alignment of these pieces on the exterior surface covering 10 is important, since seeing an odd shape or misaligned graphics can result in a less accurate and confident classification of the Soft CP 5 as a vehicle. Accordingly, plastic stiffeners can be integrated into the exterior surface covering 10 to provide shape consistency at key locations, and additional foam panel spanners for skin support between longitudinal bulkheads, including full windscreen support, may be used. Graphics for the windows on the exterior surface covering 10 may be made as one piece, permanently attached to the forward skin of the exterior surface covering 10 and attached to the aft skins of the exterior surface covering 10 via, for example, Velcro. The exterior surface covering 10 need not be one contiguous piece, but to reduce graphics misalignment, a substantial part of the exterior surface covering 10, including windows graphics, may be made as one piece. Better graphics alignment can also be achieved using buttons or other positive fasteners, which will prevent misalignment during the assembly of the Soft CP 5.

It should be noted that in a real vehicle, the radar reflecting parts are elevated on the vehicle's wheels, and much of the radar that reaches the gap between the car and the ground can continue without being reflected back to the radar sensor. Therefore, the skirts 65, 70, 75 should not be radar reflecting, and may in fact include RAM, which would help to further match the radar signature of the Soft CP 5 with that of a real vehicle. Instead of attaching separate pieces for the skirts 65, 70, 75 to the exterior surface covering 10 and/or to one or more bulkheads of the interior frame 9, the skirts 65, 70, 75 could easily be integrated into the exterior surface covering 10 without departing from the scope of the invention.

It should further be noted that the various radar and VIR visibility improvement disclosed herein can also be applied to the exterior surface of various other types of Soft CP. As non-limiting examples, example, the Soft CP may be a balloon, a plurality of solid pieces of foam (i.e., no bulkheads) or a single solid piece of foam. The improvements disclosed herein, for example, may be applied to a flexible fabric-type covering that is draped over the pre-existing Soft CP. Also, the semi-rigid form of the Soft CP may also include not only RRM, but also RAM to better represent an accurate radar signature to the test vehicle.

The invention has been described in connection with specific embodiments that illustrate examples of the invention but do not limit its scope. Unless indicated otherwise, any feature, aspect or element of any of these example embodiments may be removed from, added to, combined with or modified by any other feature, aspect or element. As will be apparent to persons skilled in the art, modifications and adaptations to be above-described example embodiments of the invention can be made without departing from the spirit and scope of the invention, which is defined only by the following claims.

The invention claimed is:

1. A soft body system adapted to form the body and exterior surface of a Guided Soft Target for testing crash avoidance technologies in a subject vehicle, wherein the soft body system is adapted to be mounted atop a motorized Dynamic Motion Element (DME) that has a wireless communication and/or a Global Positioning System (GPS) antenna, and when so mounted, is adapted to collide with the subject vehicle while the DME is moving, the soft body system comprising:
   a semi-rigid form with an exterior surface, the form sufficiently yielding so as to impart a minimal force to the subject vehicle upon impact, said force causing minimal to no damage to the subject vehicle, the form being shaped like a passenger vehicle or a part of a passenger vehicle, the exterior surface comprising a flexible covering with a roof, a roof line and a second surface extending away from the roofline towards the ground, the second surface comprising:
      a side skirt comprised of radar absorptive material (RAM), wherein the side skirt is positioned adjacent to the ground and comprises a side skirt edge that runs substantially parallel to the ground, the side skirt adapted to prevent radar waves from entering the soft body system; and
      a side panel area above the side skirt comprised of radar reflective material (RRM),
   wherein the roof is adapted to be permeable to electromagnetic energy that is either emitted from or transmitted to the antenna.

2. The soft body system of claim 1, wherein the exterior surface comprises a front skirt made of RAM, RRM or a combination of both, wherein the front skirt is positioned adjacent to the ground and comprises a front skirt edge that runs substantially parallel to the ground, the front skirt constructed to prevent radar waves from entering the soft body system.

3. The soft body system of claim 2, wherein the exterior surface comprising a rear skirt made of RAM, RRM, or a combination of both, wherein the rear skirt is positioned adjacent to the ground and comprises a rear skirt edge that runs substantially parallel to the ground, the rear skirt constructed to prevent radar waves from entering the soft body system.

4. The soft body system of claim 3, wherein side skirt, front skirt and rear skirt circumscribe an area, and the DME is substantially disposed of in the area.

5. The soft body system of claim 2, wherein the exterior surface comprises a front overhang structure made of RRM, RAM, or a combination of both, wherein the front overhang structure is constructed to ectend away from the DME and running substantially parallel to the ground, the front overhang is constructed to prevent radar waves from entering the soft body system.

6. The soft body system of claim 3, wherein the exterior surface comprising a rear overhang structure made of RRM, RAM, or a combination of both, wherein the rear overhang structure is constructed to extend away from the DME and rung substantially parallel to the ground, and wherein the rear overhang is constructed to prevent radar waves from entering the soft body system.

7. The soft body system of claim 1, further comprising one or more wheel pieces containing RRM.

8. The soft body system of claim 7, further comprising wheel wells containing RAM.

9. The soft body system of claim 1, wherein the exterior surface covering further comprises VIR reflective material.

10. The soft body system of claim 9, wherein the VIR reflective material is located on areas of the exterior surface corresponding to positions of at least one of the following in a vehicle: license plate(s), rear brake lights, headlights, corner reflectors, and turn signal indicators.

11. The soft body system of claim 1, further comprising at least one side reflector comprised of VIR reflective material to mimic the reflectivity of a side mirror, and a support structure to hold the side reflector stable during dynamic maneuvers.

12. The soft body system of claim 1, wherein the semi-rigid form comprises a plurality of pieces.

13. The soft body system of claim 12, wherein the plurality of pieces are interconnecting longitudinal and vertical bulkheads.

14. The soft body system of claim 12, wherein the plurality of pieces comprises RRM, RAM, or a combination of both.

15. The soft body system of claim 1, wherein the side skirt is detachable.

16. The soft body system of claim 2, wherein the front skirt is detachable.

17. The soft body system of claim 3, wherein the rear skirt is detachable.

* * * * *